Aug. 22, 1939.  H. P. PHILLIPS  2,170,276

INNER PISTON EXPANDING SPRING

Filed Oct. 31, 1938

INVENTOR.
Harold P. Phillips
BY Earl F Chappell
ATTORNEYS

Patented Aug. 22, 1939

2,170,276

UNITED STATES PATENT OFFICE 2,170,276

INNER PISTON EXPANDING SPRING

Harold P. Phillips, Hastings, Mich., assignor to Hastings Manufacturing Company, Hastings, Mich.

Application October 31, 1938, Serial No. 237,803

8 Claims. (Cl. 309—43)

This invention relates to improvements in inner piston expanding springs.

The main objects of my invention are:

First, to provide an improved inner expanding spring or expander for piston rings.

Second, to provide an inner expanding spring or piston ring expander having provision for preventing the rotation thereof in a piston ring groove.

Third, to provide a piston ring expander which when assembled with a piston ring prevents rotation of the assembly in a piston ring groove.

Further objects relating to details and economies of my invention will definitely appear from the description to follow. The invention is defined in the claims.

A structure embodying the features of my invention is illustrated in the accompanying drawing, wherein.

Figure 1:
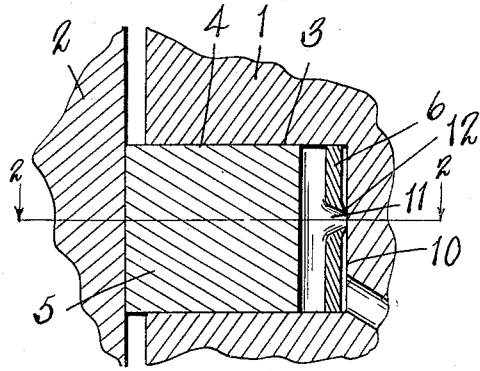
Fig. 1 is an enlarged fragmentary view in section on line 1—1 of Fig. 2, illustrating a piston ring assembly embodying my invention assembled in a piston ring groove.

In piston ring assemblies of the type including a compression ring and an inner expanding spring serving to urge the compressing ring radially outwardly into sealing engagement with the piston wall, it has been found difficult to prevent the assembly from rotating in the ring groove, the piston ring and inner expanding ring or spring expander rotating as a unit in the piston ring groove. I have found no great difficulty in preventing the outer ring from rotating with relation to the inner ring after the first few hundred miles of operation. The primary purpose of my invention is therefore to prevent the aforesaid rotation of the inner ring or spring in the groove and to thereby prevent objectionable movement of the entire assembly. This purpose is accomplished by simple provisions relating to the inner expanding spring, which will be hereinafter described.

Referring to the drawing, the reference numeral 1 in general indicates a piston which is reciprocable in a cylinder 2, the piston having the usual annular groove 3 receiving a piston ring or ring assembly, generally indicated at 4. This assembly, in the embodiment illustrated, consists of an annular split cast iron compression ring 5 which is in sliding sealing engagement with the cylinder wall. It is urged radially outwardly by means of an expander or inner expanding spring or ring 6.

Figure 2:
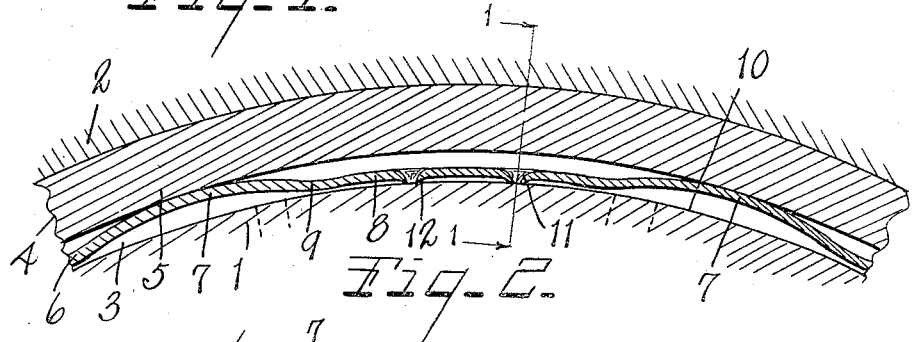
Fig. 2 is a fragmentary view on line 2—2 of Fig. 1.

The expanding ring 6 is formed of a thin strip of ribbon steel in generally crimped or polygonal outline, having the rounded piston ring engaging reaches 7 spaced by piston engaging reaches or slides 8, which are joined to the reaches 7 by the reversely curved portions 9. The sides 8 are normally in engagement with the bottom 10 of the ring groove. In accordance with a preferred embodiment of my invention, I provide certain of the sides with perforations 11 which are formed by punching the sides inwardly from the outside surface. This punching operation provides the inwardly projecting burrs or sharp corners 12 which, as illustrated in Figs. 1 and 2, constitute elements engaging the bottom of the piston groove 10 and serving to prevent rotation of the inner expanding spring relative to the piston.

Figure 3:
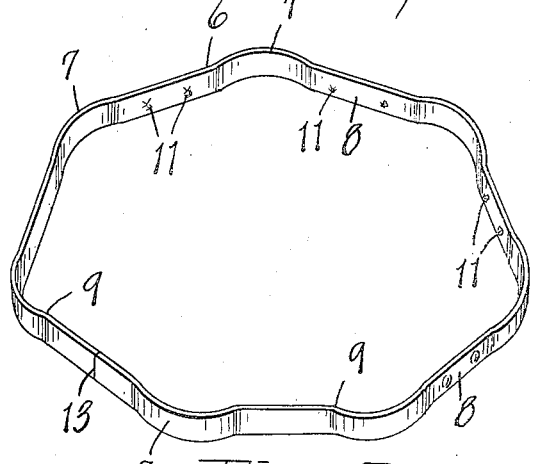
Fig. 3 is a perspective view illustrating the improved inner expanding spring of my invention.

Referring to Fig. 3, it will be observed that the punching operation is omitted on certain of the sides 8, these being preferably the sides adjacent the split 13 in the spring. The purpose of omitting the piston engaging elements at these portions or sides is to permit a certain amount of creep or sliding movement of the inner spring relative to the piston as the former expands and contracts. In the preferred construction, the inner spring 6 is perforated, i. e., provided with the piston gripping corners or burrs 12 throughout only approximately one-half of its area, which half is, as stated, preferably the area whose center is approximately 180° from the split 13. In other words, for 90° on each side of the split, the ring is preferably left with a smooth inner surface. However, modifications of the spacing of the perforations or of the total extent to which the ring is perforated or otherwise modified in accordance with my invention are possible, and I desire the appended claims to cover any construction, except as otherwise specified, which will allow the spring to grip the piston by means of the perforations or corners 12 at a portion of the area of the spring and permit the unperforated or smooth areas free movement to creep while the inner spring expands outer ring 5 in its travel up the cylinder 4 and contracts with the outer ring during its travel down the cylinder 4; this notwithstanding the total relative area or the portion of the circumference which is perforated.

Figure 5:
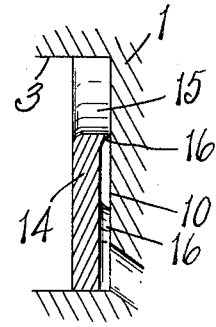
Fig. 5 is an enlarged fragmentary view in section on line 5—5 of Fig. 4.
Figure 4:
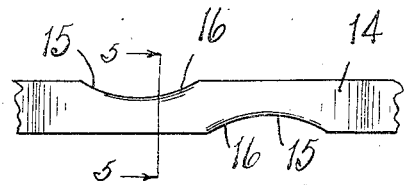
Fig. 4 is a fragmentary view in side elevation illustrating a modified expander member in accordance with my invention.

The particular shape of the perforations which bring about the gripping action of the inner spring relative to the groove may be modified. For example, in Figs. 4 and 5, I illustrate a modified embodiment of my invention relating to an inner expanding spring 14 for an oil ring having the oil drainage notches 15 punched therein from the outer circumference toward the radius. The punching operation is performed so as to form a sharp corner or burr 16 outlining each drainage opening. These openings are staggered around the circumference of the spring 14 on the upper and lower edges thereof, as illustrated, and, as in the embodiment of Figs. 1 to 3, the punching will be omitted at a portion of the circumference of the ring, preferably extending from 90° on one side of the split to 90° on the other side thereof.

Figure 6:
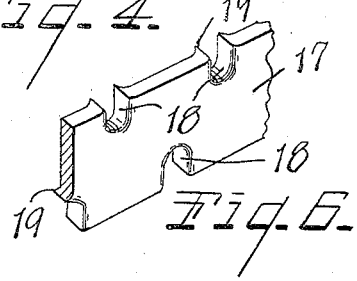
Fig. 6 is a fragmentary perspective view illustrating a still further modified embodiment of my invention.

In Fig. 6, I illustrate a still further modified embodiment of my invention, wherein the inner expanding spring 17 has the relatively small notches 18 formed on the upper and lower edges thereof in staggered circumferential arrangement, these notches being punched in the ring from the outer periphery so as to provide the piston engaging burrs or corners 19. As in the above described embodiments, I prefer that these burrs or corners be omitted throughout a predetermined portion of the circumference of the spring.

All of the aforesaid embodiments of my invention effectively prevent rotation of the inner spring in the piston groove and accordingly prevent rotation of the assembly; however, due to the omission of the cylinder gripping provisions throughout a portion of the periphery of the spring, the gripping is accomplished without detracting from the freedom of action of the inner spring to expand and contract with the outer ring whether the latter is a compression ring or an oil ring. Obviously, the aforesaid rotation-preventing provisions are very cheaply embodied in any type of expanding spring.

The size and shape of the perforations or ventilating notches are, as stated, of secondary importance in the accomplishment of the primary purpose of my invention, it being only necessary that the perforations or notches be between the crimps of the inner ring so as to contact the bottom of the groove and that they be punched or formed from the outside surface of the inner ring inwards with the piece of material which is removed being sheared off on the inside or the burr formed in the punching disposed inwardly.

In addition to affording a free expanding and contracting action for the inner spring, the oil pocket formed by the notches or perforations in the spring assist in the control of "blow-by."

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. An inner expanding member for a piston ring of the compression type, comprising a thin strip of ribbon steel having a plurality of sides adapted to engage the bottom of a piston ring groove and a plurality of bowed piston ring engaging parts spacing said sides, said member having perforations struck in said sides from the outer periphery thereof to provide inwardly projecting sharp corners or burrs adapted to engage the bottom of the groove and prevent rotation of the ring therein, said perforations being omitted from the sides adjacent the split in the ring to allow freedom of the last named sides for sliding action.

2. An inner expanding member for a piston ring of the compression type, comprising a thin strip of ribbon steel having a plurality of sides adapted to engage the bottom of a piston ring groove and a plurality of bowed piston ring engaging parts spacing said sides, said member having perforations struck in said sides from the outer periphery thereof to provide inwardly projecting sharp corners or burrs adapted to engage the bottom of the groove and prevent rotation of the ring therein.

3. An inner expanding member for a piston ring of the compression type, comprising a thin strip of spring metal having portions struck therein from the outer periphery and in spaced relation to the edges thereof whereby to provide inwardly-projecting sharp elements formed to engage the bottom of the groove and prevent rotation of the member therein, said elements being omitted adjacent the split in the member whereby to allow freedom of the member for action in expanding and contracting.

4. An inner expanding member for a piston ring of the compression type, comprising a thin strip of spring metal having recesses punched therein and bordered by offset sharp tooth-like elements or burrs formed to engage the bottom of the groove and prevent rotation of the member therein.

5. An inner expanding member for a piston ring, said member having a plurality of sides adapted to engage the bottom of a piston groove, said sides having integral sharp inwardly-projecting elements formed therein and outlining apertures in the sides, said burrs being spaced from the edges of the member and being formed to engage the bottom of the groove to prevent rotation of the member therein.

6. An inner expanding spring member for a piston ring adapted to engage the piston ring and having a plurality of sides adapted to engage the bottom of a piston groove, said sides having recesses therein outlined by integral inwardly-projecting sharp burrs, said burrs being formed to engage the bottom of the groove to prevent rotation of the member therein.

7. An inner expanding spring member for a piston ring adapted to engage the piston ring and the bottom of a piston groove, said member having recesses therein outlined by integral inwardly-projecting tooth-like sharp burrs, said burrs being formed to engage the bottom of the groove to prevent rotation of the member therein.

8. An inner expanding spring for a piston oil ring, comprising an annular split steel ribbon-like element having openings punched therein and outlined by sharp burr-like edges formed to engage the bottom of a piston groove to prevent rotation of the spring therein.

HAROLD P. PHILLIPS.